United States Patent [19]

Takeda et al.

[11] 4,378,001

[45] Mar. 29, 1983

[54] FUEL INJECTION TYPE CARBURETOR

[75] Inventors: Keiso Takeda; Shozo Inoue; Toshimi Kashiwakura, all of Susono, Japan

[73] Assignee: Toyota Jidosha Kabushiki Kaisha, Toyota, Japan

[21] Appl. No.: 167,332

[22] Filed: Jul. 9, 1980

[30] Foreign Application Priority Data

Aug. 1, 1979 [JP] Japan ............................ 54-97212

[51] Int. Cl.³ .......................................... F02M 31/12
[52] U.S. Cl. ................................. 123/445; 123/472; 123/549
[58] Field of Search ............... 123/445, 470, 472, 549, 123/547, 557

[56] References Cited

U.S. PATENT DOCUMENTS

| | | | |
|---|---|---|---|
| 1,456,018 | 5/1923 | Wiegand | 123/549 |
| 3,145,699 | 8/1964 | High | 123/445 |
| 4,211,191 | 7/1980 | Kawamura et al. | 123/445 |
| 4,211,199 | 7/1980 | Thatcher et al. | 123/445 |
| 4,213,432 | 7/1980 | Levy | 123/557 |
| 4,242,999 | 1/1981 | Hoser | 123/547 |
| 4,253,441 | 3/1981 | Kawamura et al. | 123/445 |

FOREIGN PATENT DOCUMENTS

950776 2/1964 United Kingdom ............... 123/470

*Primary Examiner*—Charles J. Myhre
*Assistant Examiner*—Andrew M. Dolinar
*Attorney, Agent, or Firm*—Kenyon & Kenyon

[57] ABSTRACT

A fuel injection type carburetor for multi-cylinder internal combustion engines includes: a throttle body having a throttle bore extending substantially vertically and being connected at the bottom portion thereof to a collecting portion of an intake manifold extending substantially horizontally; a throttle valve arranged in the throttle bore, a linear injection type fuel injection valve having a fuel injection nozzle arranged in the throttle bore in an area downstream area of the throttle valve and inclined toward the downstream direction; and an atomization promoting device arranged at a position opposite to the fuel injection nozzle so as to face the nozzle. The atomization promoting device is, for instance, a high frequency oscillator or a so-called PTC heater.

1 Claim, 3 Drawing Figures

FUEL INJECTION TYPE CARBURETOR

BACKGROUND OF THE INVENTION

The present invention generally relates to a fuel injection type carburetor, and more particularly relates to a fuel injection type carburetor of multi-cylinder internal combustion engines.

In the field of multi-cylinder gasoline internal combustion engines, a fuel injection type carburetor has been already proposed. The proposed carburetor comprises respective fuel injection valves arranged in respective intake manifolds adjacent to intake ports of respective cylinders, so that each fuel injection valve injects a required amount of fuel into the intake port of the corresponding cylinder. With this type of fuel injection carburetor, the amount of fuel to be supplied into each cylinder is advantageously uniform. On the other hand, with this type of carburetor, atomization of fuel to be supplied into the cylinders is not fully attained and a large number of fuel injection valves are required.

In order to solve these problems, another type fuel injection carburetor has been proposed, wherein one fuel injection valve is provided in the collecting portion of an intake manifold, so that fuel injected from the fuel injection valve is distributed to respective cylinders. With this type of fuel injection carburetor, it is advantageous that the fuel injection valve is electronically controlled so that a certain amount of fuel required for one combustion in each combustion chamber is intermittently injected from the fuel injection valve, and the injection fuel is, in turn, supplied into respective combustion chambers. As a result, the amount of fuel to be supplied into respective combustion cylinders is uniform.

With the latter of the above mentioned two types of fuel injection carburetors, however, the position of the fuel injection valve, the direction in which fuel is injected, and the shape of the throttle valve have a large influence on the atomization characteristics of the fuel and the uniformity of the amount of fuel to be supplied into the respectively cylinders.

SUMMARY OF THE INVENTION

An object of the present invention is to provide a fuel injection type carburetor by which the above-mentioned problems are solved.

Another object of the present invention is to provide a fuel injection type carburetor by which the atomization characteristic of fuel is improved over that of the prior art, and fuel to be supplied is uniformly distributed to respective combustion cylinders.

According to the present invention, there is provided a fuel injection type carburetor for multi-cylinder internal combustion engines comprising: a throttle body having a throttle bore extending substantially vertically and being connected at the bottom portion thereof to a collecting portion of an intake manifold extending substantially horizontally; a throttle valve arranged in the throttle bore; a linear injection type fuel injection valve having a fuel injection nozzle arranged in the throttle bore in an area downstream of the throttle valve and inclined toward the downstream side; and an atomization promoting device arranged at a position opposite to the fuel injection nozzle so as to face the nozzle. The atomization promoting device is, for instance, a high frequency oscillator or a so called PTC heater.

The present invention may be more fully understood from the description set forth below of preferred embodiments of the invention, with reference to the accompanying drawings.

DESCRIPTION OF THE EMBODIMENTS

Figure 1:
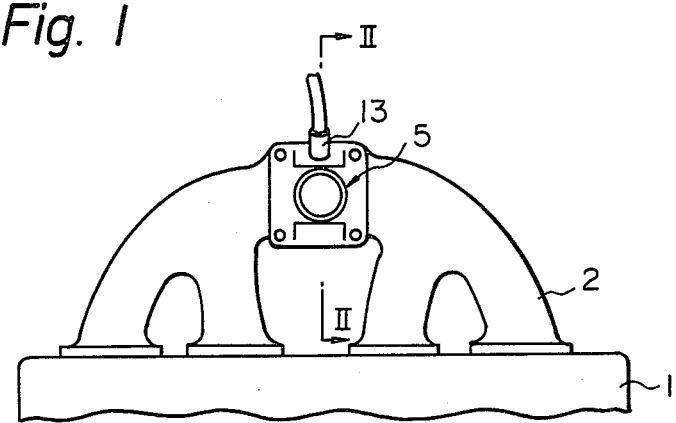
FIG. 1 is a plan view illustrating a part of a multi-cylinder internal combustion engine.
Figure 2:
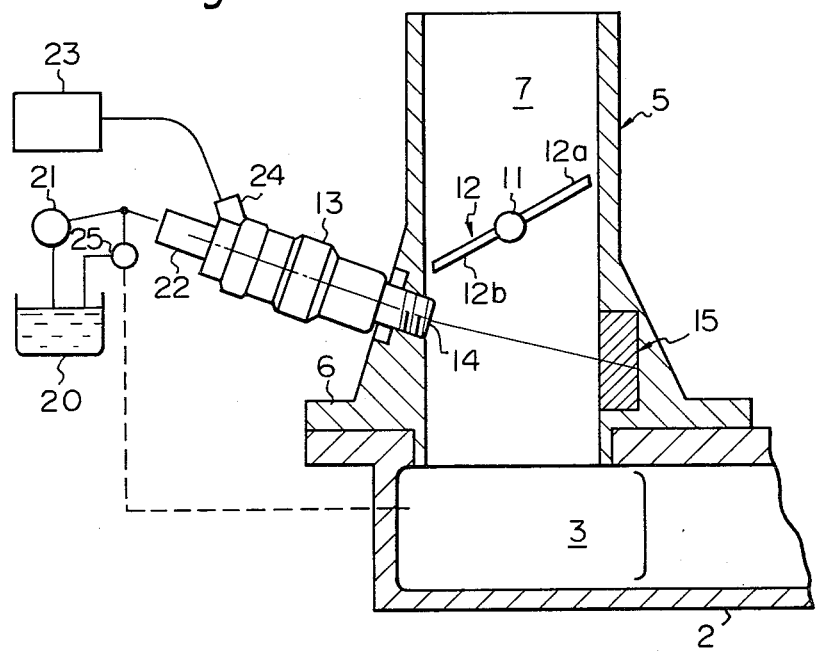
FIG. 2 is an enlarged cross-sectional view taken along line II—II in FIG. 1 and illustrating an embodiment of a fuel injection type carburetor of the present invention.

Referring now to FIGS. 1 and 2, a body 1 of a multi-cylinder internal combustion engine is provided with an intake manifold 2 rigidly secured thereto. As will be clearly understood from FIG. 2, the intake manifold 2 extends substantially horizontally and is terminated at a collecting portion 3. A substantially cylindrical throttle body 5 is provided at the bottom portion thereof with a mounting flange 6 formed integrally with the throttle body 5. The throttle body is also provided therein with a cylindrical throttle bore 7 extending substantially vertically and having a substantially uniform cross section. The flange portion 6 of the throttle body 5 is rigidly secured to the manifold collecting portion 3 through a gasket (not shown) so that the throttle bore 7 is communicated with the manifold collecting portion 3 and extends therefrom vertically upward.

In FIG. 2, a throttle shaft 11 is rotatably mounted in the throttle bore 7, and a butterfly type throttle valve 12 is rigidly secured to a throttle shaft 11. The throttle shaft 11 intersects the central axis of the throttle bore 7 and extends in a direction substantially perpendicular to the air flow direction in the intake manifold 2. The throttle valve 12 has a valve half body 12a which extends in the direction of the engine body (that is to say, in the direction of the intake manifold 2) and is seen in the right hand in FIG. 2, and; another valve half body 12b which extends in the opposite direction to 12a and is seen in the left hand in FIG. 2. The throttle shaft 11 of the throttle valve 12 is connected to an accelerator pedal in a driver's compartment of the vehicle, not shown in the drawings, so that when the accelerator pedal is pressed, the throttle valve 12 turns in a counter-clockwise direction in FIG. 2 so as to open the air passage of the throttle bore 7, and when the accelerator pedal is released, the throttle valve 12 turns in the clockwise direction in FIG. 2 so as to close the air passage of the throttle bore 7.

Downstream from, or below, the throttle valve 12 in the throttle bore 7, and at the opposite side of the bore 7 from that closet to the engine body and the intake manifold 2, a linear injection type fuel injection valve 13 is mounted on the throttle body 5. As illustrated in FIG. 2, a fuel injection nozzle 14 of the fuel injection valve 13 is slightly inclined downwardly. Therefore, fuel is injected from the fuel injection nozzle 14 in the downwardly inclined direction in due order with respect to the air flowing in the intake manifold 2.

As the fuel injection valve 13 is of the linear injection type, as mentioned above, a substantially linear fuel jet is injected from the fuel injection nozzle 14 of the fuel injection valve 13. This type of fuel injection valve is simpler in construction than a so-called swirl type fuel injection valve. Since such a linear type fuel injection valve is already known in the art, a detailed explanation concerning the construction thereof is omitted here.

Fuel to be supplied to the fuel injection valve 13 is fed to the valve 13 from a fuel tank 20 through a pipe line 22 by means of a fuel pump 21. The fuel injection valve 13 is electronically controlled by a control voltage transmitted from an electronic controller 23 through a connector 24 to the fuel injection valve 13. The fuel injection valve 13 thus injects intermittently a certain amount of fuel required for one combustion in respective cylinders and in synchronization with the time when intake valves of respective combustion cylinders are opened. Reference numeral 25 designates a pressure regulator which controls the amount of return fuel in response to the intake manifold vacuum.

In FIG. 2, an atomization promoting device 15 is provided on the inner wall of the throttle bore 7 at a position facing the fuel injection nozzle 14 of the fuel injection valve 13. The surface of the atomization promoting device 15 is preferably placed in the same surface as that of the inner wall of the throttle bore 7. The atomization promoting device 15 is, for instance, a high frequency oscillator or a so called PTC heater. A high frequency oscillator generates ultrasonic vibration by the application of electric current thereto, so that as the fuel jet injected from the fuel injection nozzle 14 of the fuel injection valve 13 strikes against the surface of the high frequency oscillator it is atomized by ultrasonic vibration. A PTC heater gives low resistance when the temperature of the surrounding environment is low; therefore, the electric current applied to the heater is high so that the heater is heated to a high temperature. Contrary to this, when the temperature of the surrounding environment is high, the resistance of the heater is high. Consequently, the electric current applied to the heater is low so that the temperature of the heater is low. When the PTC heater is used, particularly when the engine is started or when the temperature of the engine is low, a fuel jet injected from the fuel injection nozzle 14 of the fuel injection valve 13 strikes against the surface of the PTC heater and is heated thereby, so that atomization of the fuel is promoted.

Figure 3:
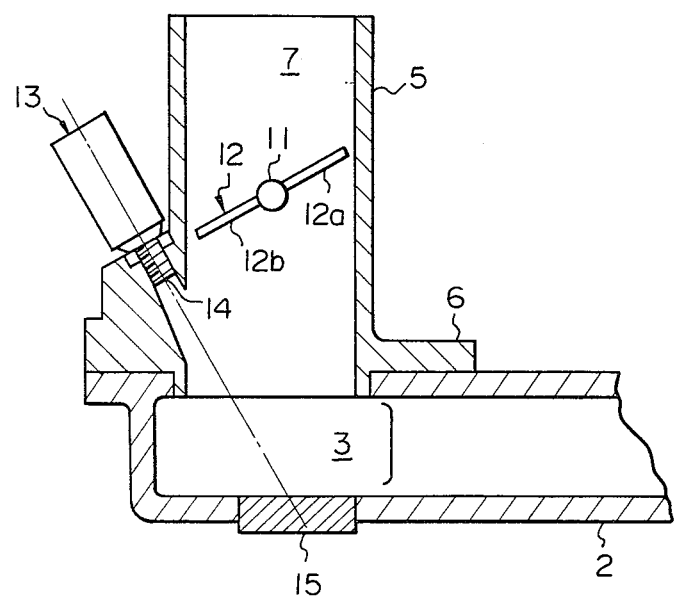
FIG. 3 is a cross-sectional view illustrating another embodiment of a fuel injection type carburetor of the present invention.

In FIG. 3 another embodiment of the present invention is illustrated. In this embodiment, the fuel injection nozzle 14 of the fuel injection valve 13 is arranged so as to be steeply inclined toward the downstream direction, so that a fuel jet injected from the fuel injection nozzle 14 does not strike against the inner wall of the throttle bore 7, but is directly injected into the intake manifold collecting portion 3. An atomization promoting device 15 is provided on the lower surface of the intake manifold collecting portion 3 at a position facing the fuel injection nozzle 14 of the fuel injection valve 13. The surface of the atomization promoting device 15 is preferably placed in the same surface as that of the inner surface of the lower wall of the intake manifold collecting portion 3. In the same manner as the embodiment illustrated in FIG. 2, for instance, a high frequency oscillator or a so called PTC heater may be used as the atomization promoting device 15.

We claim:

1. A fuel injection type carburetor for a multi-cylinder internal combustion engine comprising:
    an intake passage for delivering a combustible mixture to the cylinders, said passage including a throttle body having a throttle bore extending substantially vertically upward from a bottom portion thereof, said bottom portion being connected to a collecting portion of an intake manifold extending substantially horizontally from the collecting portion to the cylinders;
    a throttle valve arranged in said throttle bore;
    a linear injection type fuel injection valve having a fuel injection nozzle arranged on one side of the said throttle bore at a location downstream of said throttle valve and inclined toward an area on the opposite side of the throttle bore downstream from said injector location; and
    an atomization promoting means forming part of the inner wall of said throttle bore and arranged at said area opposite to said fuel injection nozzle so as to face said nozzle, said atomization promoting means being a PTC heater which is heated when the temperature of the surrounding environment is low.

* * * * *